US005691512A

United States Patent [19]
Obi

[11] Patent Number: 5,691,512
[45] Date of Patent: Nov. 25, 1997

[54] POSITION TRANSDUCER, AND METHOD FOR ELIMINATING NOISE THEREFROM

[75] Inventor: Katsuhito Obi, Otone-machi, Japan

[73] Assignee: Wacom Co., Ltd., Saitama, Japan

[21] Appl. No.: 434,297

[22] Filed: May 3, 1995

[30] Foreign Application Priority Data

May 16, 1994 [JP] Japan ................ 6-125758

[51] Int. Cl.[6] ................................ G08C 21/00
[52] U.S. Cl. ................................ 178/19; 345/175
[58] Field of Search ................ 178/18, 19, 20; 345/173, 175, 178; 341/5; 382/313, 315; 375/317, 346, 351; 455/296, 303, 306, 310

[56] References Cited

U.S. PATENT DOCUMENTS

| 4,736,073 | 4/1988  | Abernathy     | 178/19  |
| 4,859,814 | 8/1989  | Sciacero et al. | 178/19  |
| 5,359,156 | 10/1994 | Chan et al.   | 178/19  |
| 5,365,253 | 11/1994 | Cheng et al.  | 178/18  |
| 5,410,750 | 4/1995  | Cantwell et al. | 455/306 |

FOREIGN PATENT DOCUMENTS

| 63-70326  | 8/1988 | Japan . |
| 3-147012  | 2/1991 | Japan . |
| 5-241722  | 7/1993 | Japan . |

*Primary Examiner*—Curtis Kuntz
*Assistant Examiner*—Paul Loomis
*Attorney, Agent, or Firm*—Shlesinger, Arkwright & Garvey LLP

[57] ABSTRACT

A position transducer, and a noise elimination method for eliminating a noise component included in a received signal of the position transducer irrespective of the frequency band of the noise component. A position transducer calculates coordinates of a position indicator by effecting predetermined signal processing on the basis of a received signal developed in one of a plurality of loop coils, arranged side by side, as a result of electromagnetic interaction between the loop coil and the position indicator. The position transducer is further provided with a subtraction means which extracts an amplitude level corresponding to the signal developed in the loop coil only resulting from the electromagnetic interaction, for each loop coil, by subtracting a noise level obtained from a signal received when a transmission means interrupts transmission, from a signal received when the transmission means carries out transmission.

16 Claims, 6 Drawing Sheets

POSITION TRANSDUCER, AND METHOD FOR ELIMINATING NOISE THEREFROM

BACKGROUND OF THE INVENTION

1. Field of the Invention

This invention relates to a position transducer and a position sensing method of obtaining coordinates, or the like, of a specified position. More particularly, the present invention relates to a position transducer and a position sensing method suitable for use as, or for use with, a position transducer such as an input pen in which a received signal is prone to include large noise.

2. Description of the Related Art

A position transducer, which determines coordinates of a position specified by a position indicator by detecting and analyzing a signal resulting from electromagnetic action between the position indicator and a loop coil, is widely used as an input device for use with a computer.

One example of the position transducer comprises a sensor section, consisting of a plurality of loop coils arranged side by side in a direction for position sensing, and a position indicator housing an electromagnetic coupling means such as a tuning circuit. Generally, the loop coil is substantially rectangular and therefore is longer in one axial direction. When position sensing is effected for two axes (for example, an X axis and a Y axis), the sensor section is provided along each of the axes. In the position transducer having such a constitution, an electromagnetic wave is generated by adequately selecting a loop coil and sending an A.C. signal from a transmitter to the loop coil, so that the tuning circuit housed in the position indicator is excited by the electromagnetic wave. At this time, an induced voltage develops when the loop coil receives the electromagnetic wave transmitted from the tuning circuit. A receiver connected to the loop coil receives the induced voltage as a receiving signal. The transmitter and the receiver are usually disposed on either longitudinal ends of the loop coils. An amplitude and a phase angle of each of object frequency components included in the received signal are obtained by processing the received signal. A loop coil to be selected is sequentially switched, and the above-mentioned operations for obtaining an amplitude and a phase angle are repeated. Coordinates of the specified position are obtained by executing computation on the basis of amplitude data or phase angle data obtained for each loop coil.

A method utilizing analog phase detection (Unexamined Japanese Patent Publn. No. Sho-63(1988)-70326), and a method utilizing high-speed analog-to-digital conversion and discrete Fourier transformation (Unexamined Japanese Patent Publn. No. Hei-3(1991)-147012), and the like, are publicly known as examples of the method of sensing an amplitude and a phase angle of a received signal. Conventionally, a received signal is appropriately amplified by a pre-amplifier, or it is passed through an appropriate band-pass filter to eliminate noise. After the received signal has been subjected to waveform shaping, each phase of the signal is detected, whereby a real part and an imaginary part of an object frequency component included in the received signal are obtained. An amplitude and a phase angle of the frequency component are calculated by the use of the real part and the imaginary part.

In another position transducer, only one of the transmitter and the receiver is occasionally positioned on the loop coil end. When only the transmitter is disposed on the loop coil end, the position indicator is provided with a receiving mechanism, and the transmitter is provided on one longitudinal end of the loop coils. On the other hand, when the receiver is disposed on the loop coil end, the position indicator is provided with a transmitting mechanism, and the receiver is provided on one longitudinal end of the loop coils. Further, Unexamined Japanese Patent Publn. No. Hei-5(1993)-241722 discloses an apparatus, wherein when the position indicator is electromagnetically coupled to each of two loop coils which are not electromagnetically coupled with each other, an amplifier is self-excited by formation of a positive feedback loop, and a resulting excitation signal is received at one end of any one of the loop coils.

In any of the position sensing methods, an amplitude and a phase angle are calculated from a real part and an imaginary part of an object frequency component included in a received signal, and coordinates are obtained on the basis of the thus obtained amplitude and phase.

Examples of such a position transducer are a tablet, a digitizer, and a touch display used as an input device of a computer.

In the various examples of the position transducer, in the case of the position transducer in which a loop coil receives a signal, the received signal frequently includes various signals as noise other than a signal produced as a result of electromagnetic interaction between the loop coil and the position indicator. Electromagnetic noise developed as a result of turn-on/turn-off and driving of a housed system, i.e., each peripheral device of a computer, or various power supplies, are considered to be causes of the noise signals. These noise sources can also cause the loop coil to bring about an induced voltage, and hence a signal, caused by the electromagnetic interaction between the loop coil and a position indicator to be detected, and the noise signals are received while both signals are added together. Some noise signals are stable, but the other noise signals can vary continuously.

In general, a band-pass filter is used for eliminating noise, and a received signal is passed through a filter set to a predetermined passband before being subjected to signal processing. Thereby, it is possible to cut noise signals in a frequency range other than the passband. However, it is impossible for the band-pass filter to eliminate a noise signal included in the passband range, i.e., a noise signal having a frequency close to the frequency of an object signal to be detected.

Such a noise signal included in a received signal brings about an erroneous result in the computation of coordinates, thereby leading to a degraded position sensing accuracy.

SUMMARY OF THE INVENTION

In view of the above-mentioned drawbacks in the art, an object of the present invention is to provide a means and a method used with a position transducer for obtaining an amplitude level of a signal to be detected with high accuracy by eliminating a noise signal in a received signal having a frequency close to an object frequency.

Another object of the present invention is to provide a means and a method used with a position transducer for obtaining an amplitude level of a signal to be detected with high accuracy by eliminating all of the noise signals included in a received signal.

Still another object of the present invention is to provide noise signal elimination means and method used with a position transducer which can cope with various noise environments.

In accordance with one aspect of the present invention, the foregoing and other objects are attained by a position transducer having a plurality of loop coils, arranged side by side in a direction of position sensing, and a position indicator for calculating coordinates, or the like, of the position indicator by sensing a signal developed in the loop coil as a result of electromagnetic interaction between the loop coil and the position indicator, and by carrying out signal processing on the basis of that signal, the position transducer comprising:

- a transmission means which can selectively transmit a signal for inducing the electromagnetic interaction or can interrupt the transmission of this signal;
- a receiving means for receiving a signal from the loop coil;
- a memory means for storing a level of the received signal obtained as a result of the signal processing of the received signal; and
- a subtraction means for extracting an amplitude level corresponding to a signal, developed in the loop coil as a result of only the electromagnetic interaction, for each of the loop coils, by subtracting a noise level obtained from a signal received when the transmission means interrupts the transmission, from a signal level obtained from a signal received when the transmission means carries out the transmission.

In this arrangement, since the transmission means capable of transmitting a signal for inducing electromagnetic interaction, and the receiving means for receiving a signal developed in the loop coil are provided, if transmission is carried out while the position indicator is placed on a loop coil, electromagnetic interaction will develop between the position indicator and the loop coil situated below that position indicator. Eventually, it is possible to receive the signal developed in the loop coil. A received signal also includes a noise signal irrelevant to the presence or absence of the electromagnetic interaction in addition to the signal developed, resulting from electromagnetic interaction. These signals are received together. The received signals are subjected to signal processing, so that a signal level is obtained. This signal level is then stored in the memory means.

Moreover, since the transmission means can interrupt transmission, it is also possible for the transmission means to receive a signal from a loop coil when transmission is not carried out. The signal received when no transmission is carried out includes only a noise signal. The signal received at this time, i.e., the noise signal, is subjected to similar predetermined signal processing, whereby a noise level is obtained. This noise level is then stored in another memory means differing from the memory means in which the signal level is stored.

An amplitude level to be detected (a component only resulting from electromagnetic interaction), and a noise level are included in the signal level while they are added together. On the other hand, the noise level includes only noise components. Therefore, it is possible to obtain only the amplitude level to be detected by subtracting the noise level from the signal level (hereinafter, a pure signal is called an "amplitude level"; a noise signal is called a "noise level"; and a mixed signal consisting of the pure signal and the noise signal is called a "signal level").

In one preferred embodiment of the present invention, the transmission means is disposed at least on one end of the loop coils.

In this arrangement, a signal for inducing electromagnetic interaction is transmitted from the transmission means disposed on one end of the loop coils to a loop coil, and a signal caused by the electromagnetic interaction between the position indicator and the loop coil is received from this loop coil.

In another preferred embodiment of the present invention, the position indicator is provided with the transmission means.

In this arrangement, a signal for inducing electromagnetic interaction is transmitted from the transmission means disposed on the position indicator, and a signal resulting from the electromagnetic interaction between the position indicator and the loop coil is received from this loop coil.

In any one of the above preferred embodiments, the transmission means executes transmission in accordance with a sequence that includes several transmissions to one loop coil and at least one interruption of transmission, and the signal level is obtained from a signal received when transmission to one loop coil is carried out. The noise level is obtained from a signal received when the transmission to the one loop coil is interrupted.

With this arrangement, the transmission means executes transmission in accordance with the sequence that includes several transmissions to one loop coil and one interruption of transmission. A signal level is obtained from a signal received when transmission to one loop coil is carried out, and a noise level is obtained from a signal received when the transmission to the one loop is interrupted. Accordingly, it is possible to obtain only an amplitude level to be obtained by subtracting the noise level from the signal level including both the amplitude level to be detected and the noise level. In this arrangement, it is possible to obtain updated noise data every time position sensing is effected with respect to one loop coil.

In any one of the above preferred embodiments, the position transducer further comprises of a second memory means for previously storing a set of noise levels, each being obtained from a signal received from each of the plurality of loop coils while the transmission means is interrupting the transmission.

In this arrangement, the second memory means is further provided. While the transmission means is interrupting transmission, signals are respectively received from the plurality of loop coils, and a set of noise levels, each noise level being obtained from a signal received from each loop coil, are obtained and are previously stored in the second memory means. Thereafter, ordinary position sensing action is executed, and it is possible to obtain a pure amplitude level by subtracting a noise level of a corresponding loop coil stored in the second memory means from a signal level obtained from the received signal.

In another preferred embodiment of the above position transducer, the position transducer further comprises a plurality of memory blocks provided in the second memory means so as to correspond to a plurality of noise environments of the position transducer; a sensing means for previously storing a set of noise levels, each being obtained from a signal received from each of the plurality of loop coils in each noise environment, into each memory block and sensing different noise environments; and a selecting means for selecting one of the plurality of memory blocks in accordance with the noise environment sensed by the sensing means.

With this arrangement, a plurality of different memory blocks are provided in the second memory means so as to correspond to different noise environments of the position transducer. Similarly to the position transducer in the previous preferred embodiment, signals are previously received respectively from the loop coils for one of the plurality of noise environments, and a set of noise levels, each noise level being obtained from a signal received from each loop coil, are obtained and stored in any one of the plurality of noise blocks. Similar operation is carried out for each of the other environments, and a set of noise levels corresponding to each memory block are previously stored. In this way, a plurality of noise level sets are prepared for a plurality of different noise environments. The position transducer is also provided with the sensing means for sensing a different noise environment, and a selecting means for selecting one of the plurality of memory blocks in accordance with the noise environment sensed by the sensing means. Hence, position sensing action is executed after an appropriate memory block has been selected in response to a noise environment, and it is possible to obtain a pure amplitude level by subtracting a noise level stored in the selected memory block from a signal level obtained from the received signal.

In accordance with another aspect of the present invention, the foregoing and other objects are attained by a position sensing method, for use in a position transducer having a plurality of loop coils arranged side by side in a direction of position detection, and a position indicator. The position sensing method, including the steps of sensing a signal developed in the loop coil as a result of electromagnetic interaction between the loop coil and the position indicator, and calculating coordinates, or the like, of the position indicator by means of predetermined signal processing based on that signal, comprises of the followings steps:

selectively transmitting a signal which brings about the electromagnetic interaction or interruption of the transmission;

receiving a signal from the loop coil;

storing a level of the received signal obtained as a result of the signal processing of the received signal;

obtaining an amplitude level, corresponding to a signal developed in the loop coil as a result of only the electromagnetic interaction, for each of the loop coils, by subtracting a noise level obtained from a signal received when the transmission means interrupts the transmission, from a signal level obtained from a signal received when the transmission means carries out transmission.

In one preferred embodiment of the above position sensing method, the transmission is executed in accordance with a sequence that includes several transmissions to one loop coil and at least one interruption of transmission, and the signal level is obtained from a signal received when transmission to one loop coil is carried out. The noise level is obtained from a signal received when the transmission to the one loop coil is interrupted.

In another preferred embodiment of the previous position sensing method, a set of noise levels, each being obtained from a signal received from each of the plurality of loop coils, are obtained while the transmission is interrupted, the set of noise levels are previously stored in the second memory means. The stored noise levels are used in the previously mentioned subtraction.

In still another preferred embodiment of the above position sensing method, a plurality of different memory blocks are formed in the second memory means so as to correspond to different noise environments of the position sensing device, and a set of noise levels, each being obtained from a signal received from each of the plurality of loop coils in each noise environment are previously stored in each memory block. Subsequently, a different noise environment is sensed. One of the plurality of memory blocks is selected in accordance with the noise environment sensed by the sensing means. Each noise level in the thus selected memory block is used in the previously mentioned subtraction.

In accordance with the present invention, the position transducer is provided with the subtraction means for subtracting a noise level (or a noise energy) obtained from a noise signal, from a signal level (or a signal energy) obtained from a received signal including noise. Hence, it is possible to eliminate all of the noise components in respect to the frequency of noise. Thus, when compared with a conventional band-pass filter, the effect and efficiency of noise elimination are extraordinarily improved. This makes it possible to obtain a pure amplitude level (or an oscillation energy), and also to improve the accuracy of computation of coordinates carried out on the basis of this true value.

BRIEF DESCRIPTION OF THE DRAWINGS

FIGS. 4A and 4B are schematic representations showing the structure of a signal sensing section of a position transducer in another embodiment of the present invention, wherein FIG. 4B shows contents stored in a second memory element;

DESCRIPTION OF THE PREFERRED EMBODIMENTS

Figure 1:
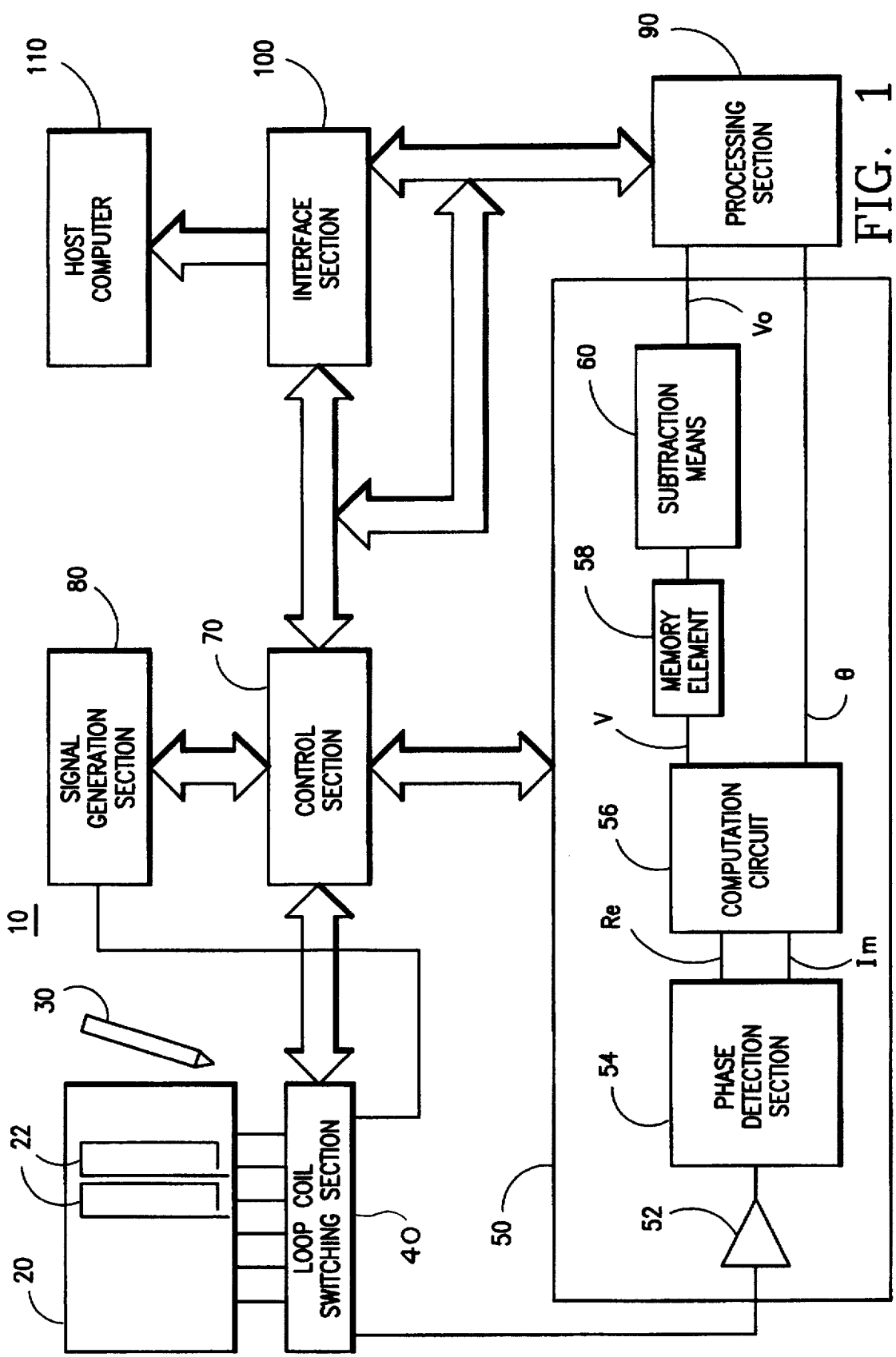
FIG. 1 is a block diagram of a position transducer in one embodiment of the present invention.

FIG. 1 is a block diagram of the structure of a position transducer 10 in a first embodiment of the present invention.

In FIG. 1, some of a plurality of loop coils 22 arranged side by side in a sensor section 20 are shown. The position transducer 10 is made up of a position indicator 30, a loop coil switching section 40, a signal sensing section 50, a control section 70, a signal generation section 80, a processing section 90, an interface section 100, and a host computer 110.

The sensor section 20 is made from an electrically conductive material and is provided on a substrate by the use of, for example, pattern deposition, etching or screen printing. Although the loop coils 22 are arranged only in one direction in FIG. 1, it will be possible to calculate coordinates in two axes by providing two sets of the loop coils, arranged side by side, along X and Y axes in such a way that these two sets of the loop coils cross at right angles.

The loop coil switching section 40 selects each of the loop coils 22, and switches the loop coil between a transmission state and a receiving state. Timing of the selection and switching action is controlled by the control section 70 based on an instruction from the processing section 90.

The position indicator 30 is a so-called cursor or an input pen. An electromagnetic coupling means such as a coil or a capacitor is integrally incorporated in a housing, which permits electromagnetic coupling of the position indicator 30 with the loop coil 22. If a switching mechanism is additionally provided, it will be possible to detect a position selected by the position indicator by varying an electromagnetic coupling frequency when the switch is turned on.

In the first embodiment shown in FIG. 1, the position transducer 10 is constructed in such a way that a signal for bringing about electromagnetic interaction is sent from the loop coil, and hence the position transducer 10 is provided with the signal generation section 80. The signal generation section 80 generates and outputs an A.C. signal having an arbitrary frequency and phase by utilization of, for example, a random access memory (RAM) or a read only memory (ROM) which stores A.C. signal data, a digital-to-analog (DA) converter, and a low pass filter.

The signal sensing section 50 causes a signal received from the loop coil 22 to be subjected to predetermined processing, and an amplitude and a phase angle of an object frequency component are calculated. The processing of the received signal comprises the steps of appropriately adjusting the level of the received signal in a pre-amplifier 52, and effecting phase detection in a phase detection section 54. A method utilizing analog phase detection (Japanese Patent Publn. No. Hei-2(1990)-53805), and a method utilizing Fourier transformation (Japanese Patent Publn. No. Hei-3 (1991)-147012) are publicly known as examples of a phase sensing means. Both methods obtain a real part (Re) and an imaginary part (Im) of an object frequency component included in a received signal. Thereafter, a signal level V and a phase angle θ of an object frequency component are calculated in a computation circuit 56 by the use of the real part and the imaginary part. The signal level is calculated from $(Re^2+Im^2)^{1/2}$, whereas the phase angle θ is calculated from arctan(Im/Re). For convenience of computation, in some case, an amplitude is evaluated as a value obtained from $Re^2+Im^2$, i.e. an amplitude energy value.

In the present invention, a noise level is eliminated from the signal level V calculated by the computation circuit 56, and a resulting signal is further subjected to processing to obtain a pure amplitude level Vo using a memory element 58 and a subtraction means 60. When the amplitude is treated as an energy value in the manner as previously mentioned, a noise component is treated not as a noise level but as noise energy. Although the amplitude and the noise are represented as a level (voltage) in the subsequent description, these can also be expressed as energy. This noise elimination mechanism will be described later.

Data representing the pure amplitude level Vo and the phase angle θ being obtained in the signal sensing section 50 are fed to the processing section 90. The processing section 90 executes the computation of coordinates based on the data as well as executing general control of data transmission between the processing section 90 and the host computer 110, and each part of the position transducer 10.

The control section 70 operates based on an instruction from the processing section 90 and controls timing of each part of the position transducer in accordance with a previously set sequence.

The interface 100 executes the input and output of data to and from the host computer 110.

The basic flow of operations of position sensing action, which the position transducer performs, will be briefly mentioned. The processing section 90 sends the signal generation section 80 an instruction for transmitting a sine wave having a predetermined frequency of, for example, 500 kHz for a predetermined period, for example, 32 μS. Meanwhile, the processing section 90 sends the control section 70 switching data for switching a loop coil. As a result of this, the control section 70 executes the switching of the loop coil switching section 40, and the transmission and receipt of a signal. At this time, if the position indicator 30 is situated on the selected loop coil, a received signal will include a signal developed as a result of electromagnetic interaction. Subsequently, the signal sensing section 50 processes the received signal, and data representing an amplitude level and a phase angle of a 500 kHz component in the received signal are transmitted to the processing section 90. Loop coils which select the previously mentioned operations are sequentially switched, and the above operations are repeated, whereby an amplitude level data pattern is obtained. Having determined the loop coil where the position indicator 30 is situated from that pattern, the processing section 90 sends the interface section 100 a result, obtained as result of computation of coordinates of that position, together with phase data. The host computer 110 reads these data by accessing the interface 100.

The elimination of a noise component from the signal level V after the phase detection in the signal sensing section 50 will now be described.

Figure 2:
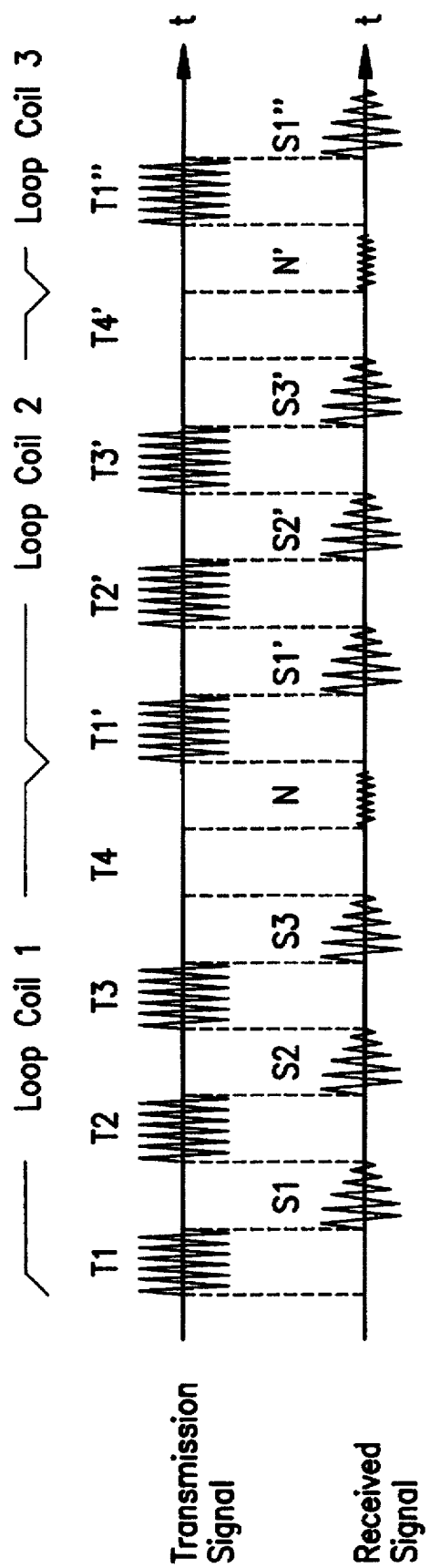
FIG. 2 is a schematic representation showing waveforms of a transmission signal and a received signal in the first embodiment shown in FIG. 1.

FIG. 2 shows waveforms of a transmission signal to, and a received signal from, the loop coil in the first embodiment shown in FIG. 1. The horizontal axis of the diagram shows time. In the drawing, the period designated by a loop coil 1 represents a transmission signal to, and a received signal from, a selected loop coil 1. The period designated by a loop coil 2 represents a transmission signal to, and a received signal from, another selected loop coil 2. As shown in the drawing, when the loop coil 1 is selected, the loop coil 1 is switched to a transmission state, and a signal T1 ($f_o$) is sent. As previously mentioned, this transmission period is, for example, 32 μs.

The loop coil 1 is then switched to a receiving state, and the loop coil 1 receives a signal S1. When the position indicator 30 is situated on the loop coil 1, a received signal, as shown in the drawing, is produced. In practical position sensing, transmission to one loop coil is repeated several times as shown in the drawing, whereby received signals S1, S2, S3 are obtained. The accuracy of sensing is improved by averaging these received signals. For simplicity of explanation, the number of repetitions is represented as being three times in the drawing. The transmission and receiving sequences are sequentially executed for all of the loop coils by switching the loop coils.

In the first embodiment shown in FIG. 1, periods, for example, the periods designated by T4 and T4' in FIG. 2 during which transmission is possible but is interrupted, are provided in the transmission sequence for one loop coil. Received signals N and N' corresponding to the transmission interruption periods are received in the same manner as the received signals S1 through S3, and the received signals S1' through S3'. Although only one transmission interruption period is provided in FIG. 2, it is possible to measure a noise signal several times and average the measured values in order to improve noise signal data.

The received signals S1 through S3 include noise signals arising from various noise sources in addition to the previously mentioned signal, developed only as a result of electromagnetic interaction between the position indicator 30 and the loop coil. On the other hand, the received signal N, corresponding to the transmission interruption period, does not include the signal developed as a result of electromagnetic interaction but includes solely a noise signal. The noise signal N is observed at a very small interval of time just subsequent to the received signals S1 through S3. It is possible to regard the noise signal as having substantially the same level as the noise component included in the received signals S1 through S3.

By virtue of the transmission and receiving sequences shown in FIG. 2, it is possible to obtain an ordinary received signal and a noise signal included in the received signal for each loop coil.

Figure 3:
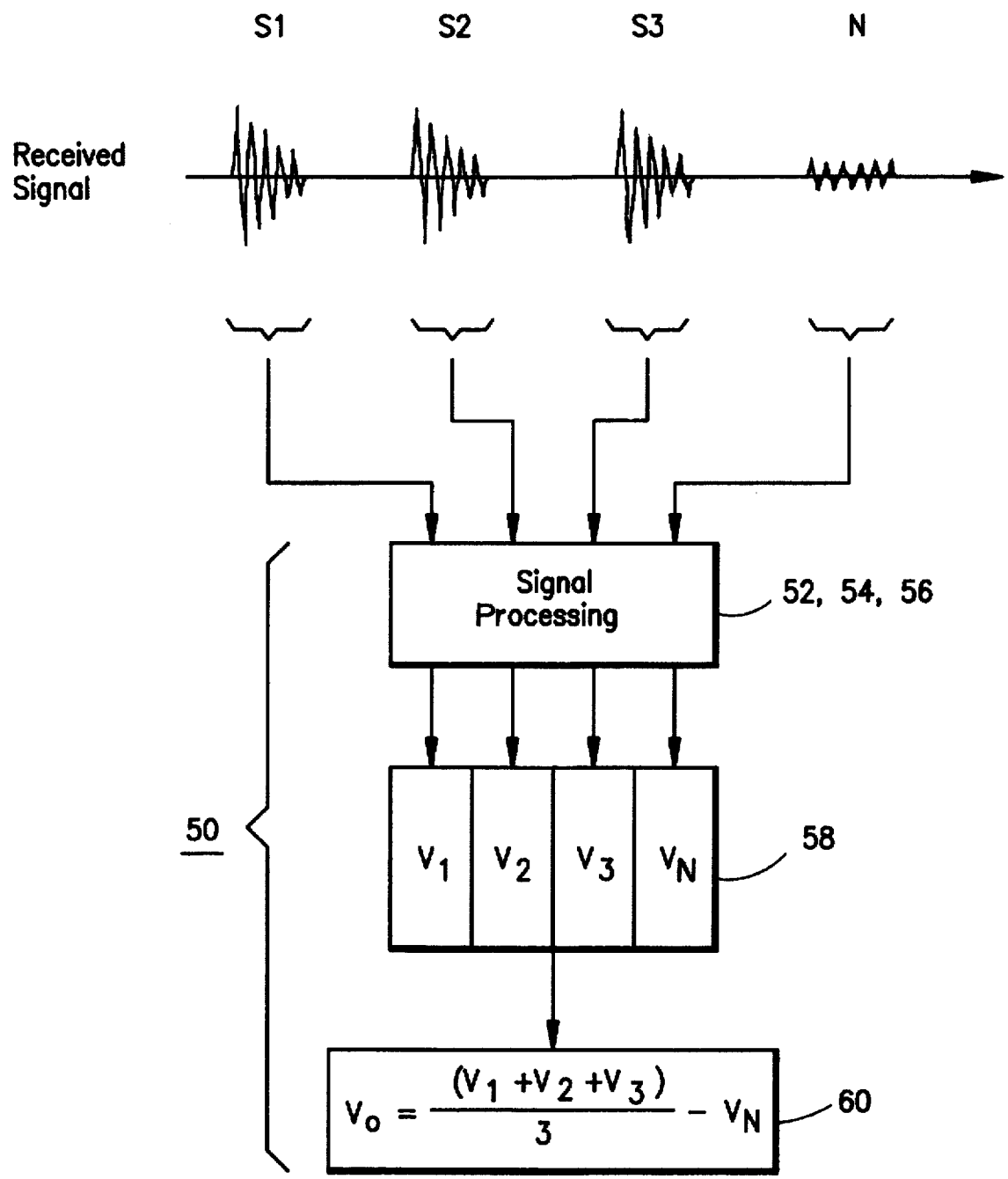
FIG. 3 is a schematic representation showing the waveform of the received signal in the first embodiment shown in FIG. 1 and processing executed at a signal sensing section.

FIG. 3 is an explanatory view illustrating the processing of a signal obtained from one loop coil in the first embodiment shown in FIG. 1. The waveform of the received signal shown in FIG. 3 is a part of the enlarged signal received from the loop coil 1 shown in FIG. 2. FIG. 3 shows a noise component included in the received signals S1 through S3. Reference symbol N designates a noise signal including solely a noise component. These received signals are processed by the pre-amplifier 52, the phase detection section 54, and the computation circuit 56 of the signal sensing section 50. As a result of this, signal levels $V_1$ through $V_3$ and a noise level $V_N$ of an object frequency component are respectively obtained. Phase angle data of each of the signal levels are also respectively obtained at the same time the signal levels are obtained.

The thus obtained signal level data $V_1$ through $V_3$ and the noise level $V_N$ are temporarily stored in the memory element 58. A RAM can be used as this memory element 58. After the transmission and receiving sequences for one loop coil have been executed, subtraction is performed in the subtraction means 60 by the use of the data stored in the memory element 58. In the expression shown in the block designated by 60 in the drawing, the first term $(V_1+V_2+V_3)/3$ is ordinary processing for obtaining an average value of the received signal. This average value is taken as a measured signal level. A noise component in the signal level is eliminated by subtracting the noise level $V_N$ from the signal level, whereby it is possible to obtain a pure amplitude level Vo. In the first embodiment shown in FIG. 1, it is possible to cope with noise conditions which vary continuously. Moreover, by virtue of this subtraction means, it is possible to eliminate all of the noise components irrespective of the frequency of noise.

The subtraction means 60 may be constituted in the form of either hardware or software.

Data, representing the amplitude level $V_O$ and being obtained as result of the subtraction, are transmitted to the processing section 90 together with the phase angle data.

Figure 4A:
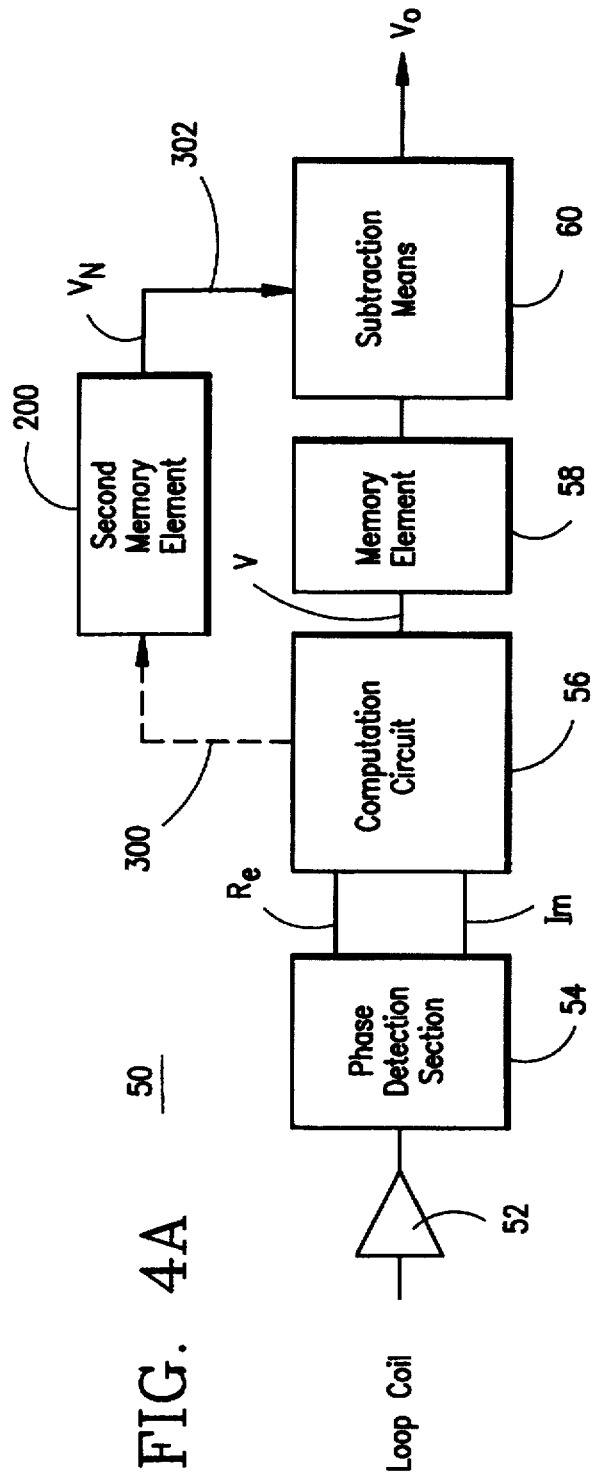
Figure 4B:
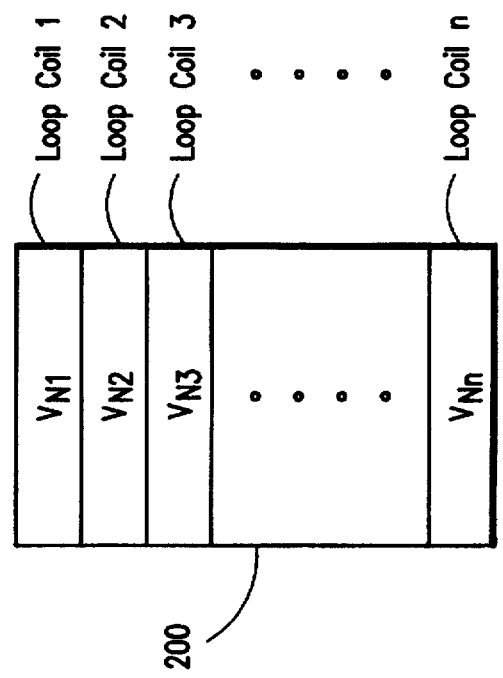

FIGS. 4A and 4B are schematic representations showing the structure of the signal sensing section 50 in a second embodiment of the present invention. In the second embodiment, a second memory element 200 is provided for previously storing data representing a noise level in the manner as shown in FIG. 4A. In regard to the position sensing in this embodiment, a response corresponding to the transmission interruption is received for all of the loop coils prior to the initiation of transmission to the loop coils. In other words, the noise signal N, corresponding to the signal T4 shown in FIG. 2 is previously received for each loop coil, and the received signal is subjected to signal processing by the elements 52 to 56. Thus, a set of noise levels, consisting of noise levels respectively corresponding to the loop coils, are stored into the second memory element 200 (designated by a broken line 300).

FIG. 4B is a schematic representation showing contents stored in the second memory element 200. $V_{N1}$, $V_{N2}$, $V_{N3}$, ... $V_{Nn}$ designate data representing a previously measured noise level of each loop coil. A ROM, an EPROM, an EEPROM, or the like, may be used as the second memory element.

After a set of noise levels, consisting of noise levels of respective loop coils, have been stored in the second memory element, ordinary position sensing action is carried out. Accordingly, ordinary transmission without inclusion of the transmission interruption period T4 shown in FIG. 2 is affected. For the selected loop coil, signals corresponding to the signals S1 through S3 are subjected to signal processing, and a result of the processing is then stored in the memory element 58. An average value of these signals is taken as a signal level, and the data representing the noise level of the selected loop coil stored in the second memory element is recalled. A pure amplitude level is extracted by subtracting the noise level data from the signal level to eliminate a noise component.

Since it is not necessary for the embodiment, shown in FIGS. 4A and 4B, to provide an additional interruption period, it is possible to facilitate the transmission operation and shorten a measuring period. However, differing from the position transducer in the first embodiment shown in FIG. 1, the position transducer in this embodiment cannot cope with noise environments which vary continuously.

Usually, noise environments vary continuously depending on conditions of the use of a system. For example, the actuation of a hard disk drive unit or the turn-on/turn-off of a back light of an LCD cause the noise environments to vary.

Figure 5:
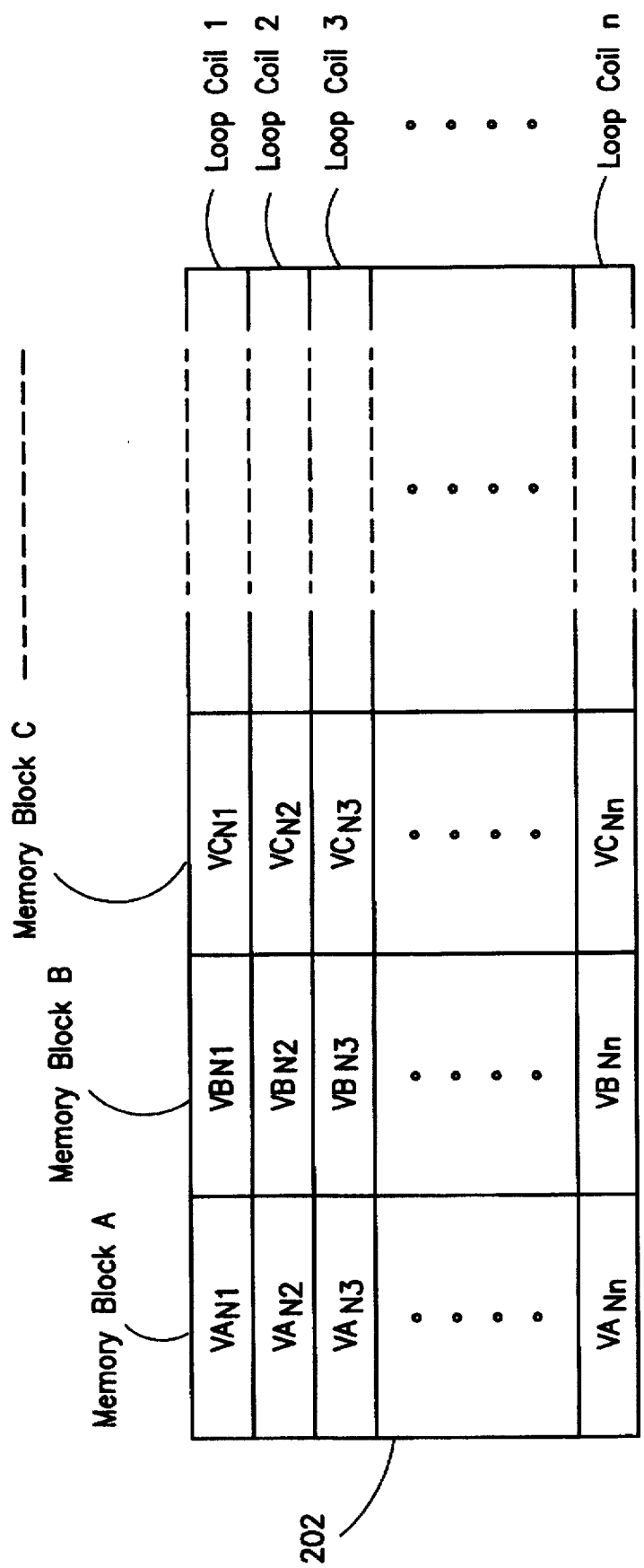
FIG. 5 is a schematic representation showing another embodiment of the second memory element in the embodiment shown in FIG. 4.

In contrast to the second memory element 200 in the embodiment shown in FIGS. 4A and 4B, FIG. 5 shows a second memory element 202 in another embodiment which is further provided with a means capable of coping with variations in noise environments. The second memory element 202 shown in FIG. 5 consists of a plurality of memory blocks A, B, C, ..., where one memory block corresponds to the second memory element 200 shown in FIGS. 4A and 4B. A set of data, consisting of noise levels of respective loop coils for any one of a plurality of different noise environments, are stored in each memory block. This provides a plurality of sets of noise levels with respect to a plurality of noise environments. These sets of noise level data stored in the memory blocks are all data which were previously measured prior to position sensing. For instance, the noise level data may be data measured during a step of assembling the position transducer, or may be data measured in accordance with conditions of a system when the use of the position transducer is initiated together with the system. Moreover, if a new noise source is added, it is possible to add a new memory block so as to cope with the environment having that noise source.

It is possible to use a ROM, an EPROM, an EEPROM, or the like, as the second memory element 202 shown in FIG. 5.

Figure 6:
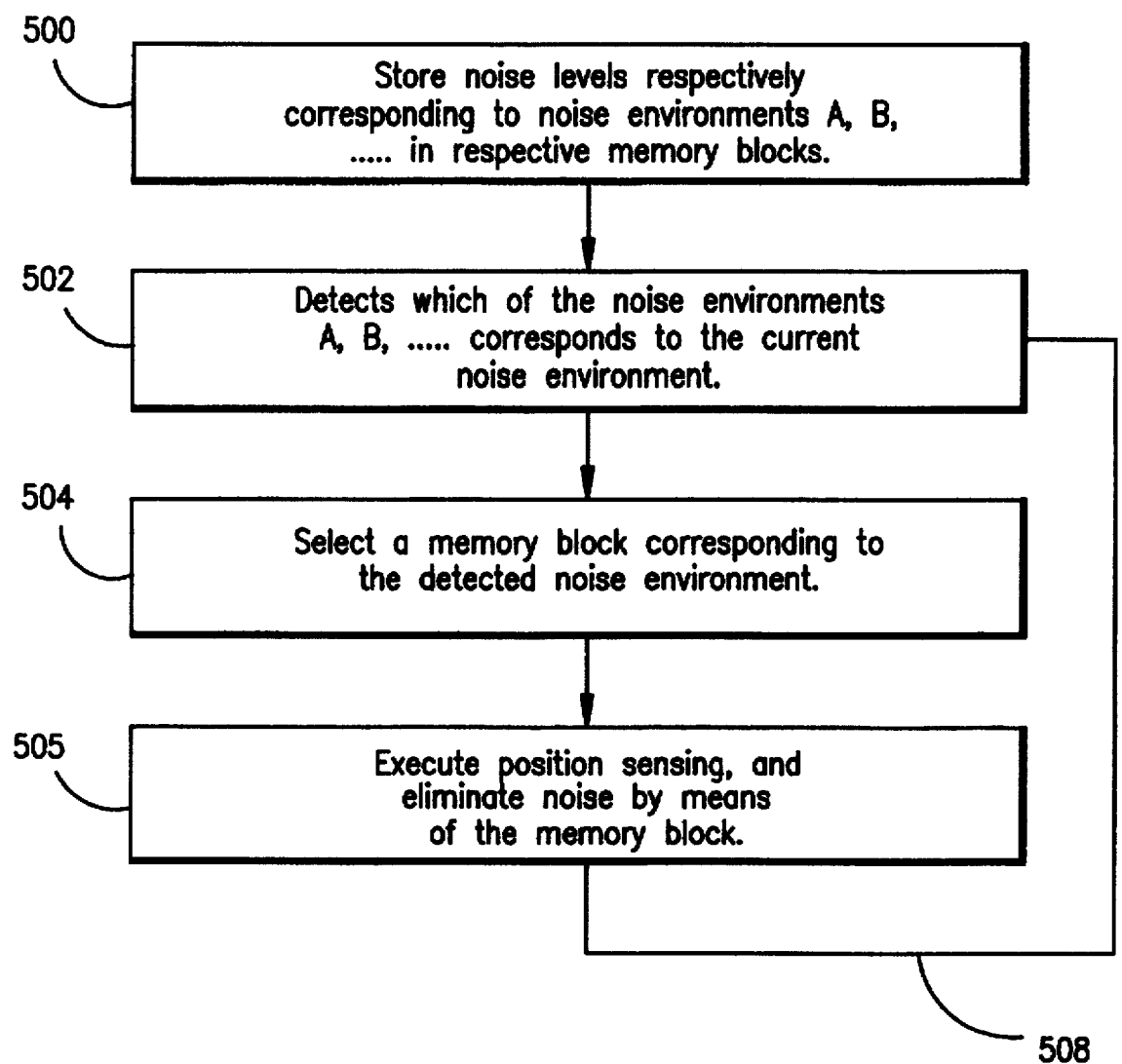
FIG. 6 is a flow chart showing the course of operations of position sensing performed using the second memory element shown in FIG. 5.

FIG. 6 shows a flow of operations in the system of the position transducer equipped with the second memory element 202 shown in FIG. 5. Step 500 shows sets of noise level data, each corresponding to each noise environment, previously stored in respective memory blocks. A noise environment is sensed in step 502. The sensing of the noise environment is carried out on the basis of switching associated with, for example, a hard disk drive unit and a power source of a back light for an LCD. In subsequent step 504, a memory block corresponding to the sensed noise environment is selected. In step 506, position sensing is effected, and the elimination of a noise component is carried out by the use of the selected memory block. As shown by flow 508, it is made possible for the position transducer to constantly sense variations in noise environments. If any variations in noise environments are sensed during the position sensing, it is possible to carry out appropriate noise elimination, at all times, by switching the memory block to an adequate memory block, and by continuing the position sensing.

The use of the second memory element 202 shown in FIG. 5 makes it possible to facilitate the transmission operation, to reduce a measuring time, and to cope with variations in noise environments.

The present invention can be effectively applied to a position transducer in which a signal is transmitted from a loop coil, as well as to a position transducer in which a signal is transmitted from the position indicator and received by a loop coil. Likewise, the present invention is also applicable to a position transducer in which position detection is effected by utilization of an oscillation signal resulting from electromagnetic coupling between a loop coil and a position indicator.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to persons skilled in the art.

What is claimed is:

1. A position transducer, comprising:
   a plurality of loop coils arranged side by side in a direction of position sensing;
   a position indicator for electromagnetic interaction with one of said loop coils;
   a transmission means for selectively transmitting or interrupting a first signal to said one of said loop coils;
   a receiving means for receiving a second signal from said one of said loop coils;
   a first memory means for storing a level of said second signal, said level being obtained as a result of processing of said second signal;
   subtraction means for extracting an amplitude level, corresponding to said second signal developed in said one of said loop coils as a result of the electromagnetic interaction of said position indicator with said one of said loop coils, by subtracting a noise level obtained from a third signal received when transmission of said first signal is interrupted, from said second signal level; and
   processing means for calculating coordinates of said position indicator based on said amplitude level.

2. A position sensing method, for use in a position transducer having a plurality of loop coils arranged side by side in a direction of position sensing, and a position indicator for electromagnetic interaction with one of the loop coils, said method comprising the steps of:
   selectively transmitting and interrupting a first signal to the one of the loop coils to cause electromagnetic interaction with the position indicator;
   receiving a second signal from the one of the loop coils;
   storing in a first memory means a level of the second signal, the level being obtained as a result of processing the second signal;
   obtaining an amplitude level, corresponding to the second signal as a result of the electromagnetic interaction of the one of the loop coils with the position indicator, by subtracting a noise level obtained from a third signal received when the first signal is interrupted, from the second signal level; and
   calculating coordinates of the position indicator based on the amplitude level.

3. The position sensing method according to claim 2, wherein said step of transmitting and interrupting is executed in accordance with a sequence including several transmissions to one loop coil and at least one interruption of transmission, the second signal level being obtained from the second signal received when the transmission to one loop coil is carried out, the noise level being obtained from the third signal received when the transmission to the one loop coil is interrupted.

4. The position sensing method according to claim 2, and further comprising the steps of:
   obtaining a set of noise levels, each being obtained from the third signal received from each of the plurality of loop coils while the transmission is interrupted;
   storing the set of noise levels in a second memory means; and
   using the stored noise levels in said step of subtracting.

5. The position sensing method according to claim 4, and further comprising the steps of:
   providing a plurality of different memory blocks in the second memory means so as to correspond to different noise environments of the position transducer;
   storing the set of noise levels in the plurality of different memory blocks;
   sensing a different noise environment;
   selecting one of the plurality of memory blocks in accordance with the noise environment detected; and
   using the noise level in the selected memory block in said subtraction.

6. The position transducer according to claim 1, wherein said transmission means is disposed at least on one end of said loop coils.

7. The position transducer according to claim 1, wherein said position indicator is provided with said transmission means.

8. The position transducer according to claim 1, wherein the transmission means executes transmission in accordance with a sequence that includes several transmissions to one loop coil and at least one interruption of transmission; said second signal level being obtained from said second signal received when transmission to one loop coil is carried out; the noise level being obtained from said third signal received when said transmission to said one loop coil is interrupted.

9. The position transducer according to claim 8, wherein the transmission means executes transmission in accordance with a sequence that includes several transmissions to one loop coil and at least one interruption of transmission; said second signal level being obtained from said second signal received when transmission to one loop coil is carried out; the noise level being obtained from a signal received when said transmission to said one loop coil is interrupted.

10. The position transducer according to claim 9, wherein the transmission means executes transmission in accordance with a sequence that includes several transmissions to one loop coil and at least one interruption of transmission; said second signal level being obtained from said second signal received when transmission to one loop coil is carried out; and the noise level being obtained from a signal received when said transmission to said one loop coil is interrupted.

11. The position transducer according to claim 1, further comprising a second memory means for previously storing a set of noise levels, each being obtained from said third signal received from each of the plurality of loop coils while said transmission means is interrupting said transmission.

12. The position transducer according to claim 6, further comprising a second memory means for previously storing a set of noise levels, each being obtained from said third signal received from each of the plurality of loop coils while said transmission means is interrupting said transmission.

13. The position transducer according to claim 7, further comprising a second memory means for previously storing a set of noise levels, each being obtained from said third signal received from each of the plurality of loop coils while said transmission means is interrupting said transmission.

14. The position transducer according to claim 11, further comprising:
- a plurality of memory blocks provided in said second memory means so as to correspond to a plurality of noise environments of said position transducer;
- a sensing means for previously storing a set of noise levels, each being obtained from a signal received from each of said plurality of loop coils in each noise environment, into each memory block and sensing different noise environments; and
- a selecting means for selecting one of the plurality of memory blocks in accordance with the noise environment sensed by the sensing means.

15. The position transducer according to claim 12, further comprising:
- a plurality of memory blocks provided in said second memory means so as to correspond to a plurality of noise environments of said position transducer;
- a sensing means for previously storing a set of noise levels, each being obtained from a signal received from each of said plurality of loop coils in each noise environment, into each memory block and sensing different noise environments; and
- a selecting means for selecting one of the plurality of memory blocks in accordance with the noise environment sensed by the sensing means.

16. The position transducer according to claim 13, further comprising:
- a plurality of memory blocks provided in said second memory means so as to correspond to a plurality of noise environments of said position transducer;
- a sensing means for previously storing a set of noise levels, each being obtained from a signal received from each of said plurality of loop coils in each noise environment, into each memory block and sensing different noise environments; and
- a selecting means for selecting one of the plurality of memory blocks in accordance With the noise environment sensed by the sensing means.

* * * * *